United States Patent
Nayebi et al.

[19]

[11] Patent Number: 6,043,850
[45] Date of Patent: Mar. 28, 2000

[54] BURST GATE PULSE GENERATOR CIRCUIT

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 08/852,918

[22] Filed: May 8, 1997

[51] Int. Cl.$^7$ ............................................... H04N 9/45
[52] U.S. Cl. .................................... 348/506; 348/505
[58] Field of Search ............................ 348/505, 506, 348/536, 537, 538, 53 P; H04N 9/45, 9/455

[56] References Cited

U.S. PATENT DOCUMENTS

| | | | |
|---|---|---|---|
| 3,730,982 | 5/1973 | Niimi et al. | 178/5.4 CK |
| 3,789,141 | 1/1974 | Ayaki et al. | 178/69.5 CB |
| 3,918,085 | 11/1975 | Numakura et al. | 358/4 |
| 4,007,482 | 2/1977 | Amari | 358/4 |
| 4,054,903 | 10/1977 | Ninomiya | 358/8 |
| 4,120,000 | 10/1978 | Ninomiya | 358/8 |
| 4,149,180 | 4/1979 | Lovely | 348/506 |
| 4,165,524 | 8/1979 | Ninomiya | 360/36 |
| 4,173,023 | 10/1979 | Lagoni et al. | 358/20 |
| 4,228,456 | 10/1980 | Lovely | 358/20 |
| 4,404,583 | 9/1983 | Tatami | 358/13 |
| 4,550,338 | 10/1985 | Kojima | 358/20 |
| 4,706,034 | 11/1987 | Kojima | 328/151 |
| 4,714,954 | 12/1987 | Yoshinaka et al. | 358/19 |
| 4,733,311 | 3/1988 | Yoshinaka | 358/320 |
| 5,130,785 | 7/1992 | Jang et al. | 358/20 |
| 5,325,184 | 6/1994 | Choi | 348/506 |
| 5,386,296 | 1/1995 | Craft | 358/316 |
| 5,844,621 | 12/1998 | Ngo et al. | 348/506 |

FOREIGN PATENT DOCUMENTS

| | | | |
|---|---|---|---|
| 0 375904 | 7/1990 | European Pat. Off. | H04N 9/455 |
| 60-220691 | 11/1985 | Japan | H04N 9/455 |
| 61-251224 | 11/1986 | Japan | H03K 3/64 |
| 62-157494 | 7/1987 | Japan | H04N 9/455 |
| 01135185 | 5/1989 | Japan | H04N 5/455 |

*Primary Examiner*—Chris Grant
*Attorney, Agent, or Firm*—Haverstock & Owens LLP

[57] ABSTRACT

A burst gate pulse generator circuit generates a burst gate pulse signal representative of a time period during which a burst signal is present within a composite video signal without requiring external components. Each period of the composite video signal includes a horizontal synchronization signal pulse, a burst signal and a video information signal. A pair of integrated capacitors are discharged during the horizontal synchronization pulse. The capacitors are charged at different rates by two current sources after the horizontal synchronization pulse. A first amount of charge across a first capacitor rises above a predetermined threshold level in a first time period. The burst gate pulse signal is activated when the first amount of charge rises above the predetermined threshold level. This occurs before the burst signal is present within the composite video signal. A second amount of charge across a second capacitor rises above the predetermined threshold level in a second time period. The burst gate pulse signal is deactivated when the second amount of charge rises above the predetermined threshold level. This occurs after the burst signal is complete within the composite video signal.

18 Claims, 4 Drawing Sheets

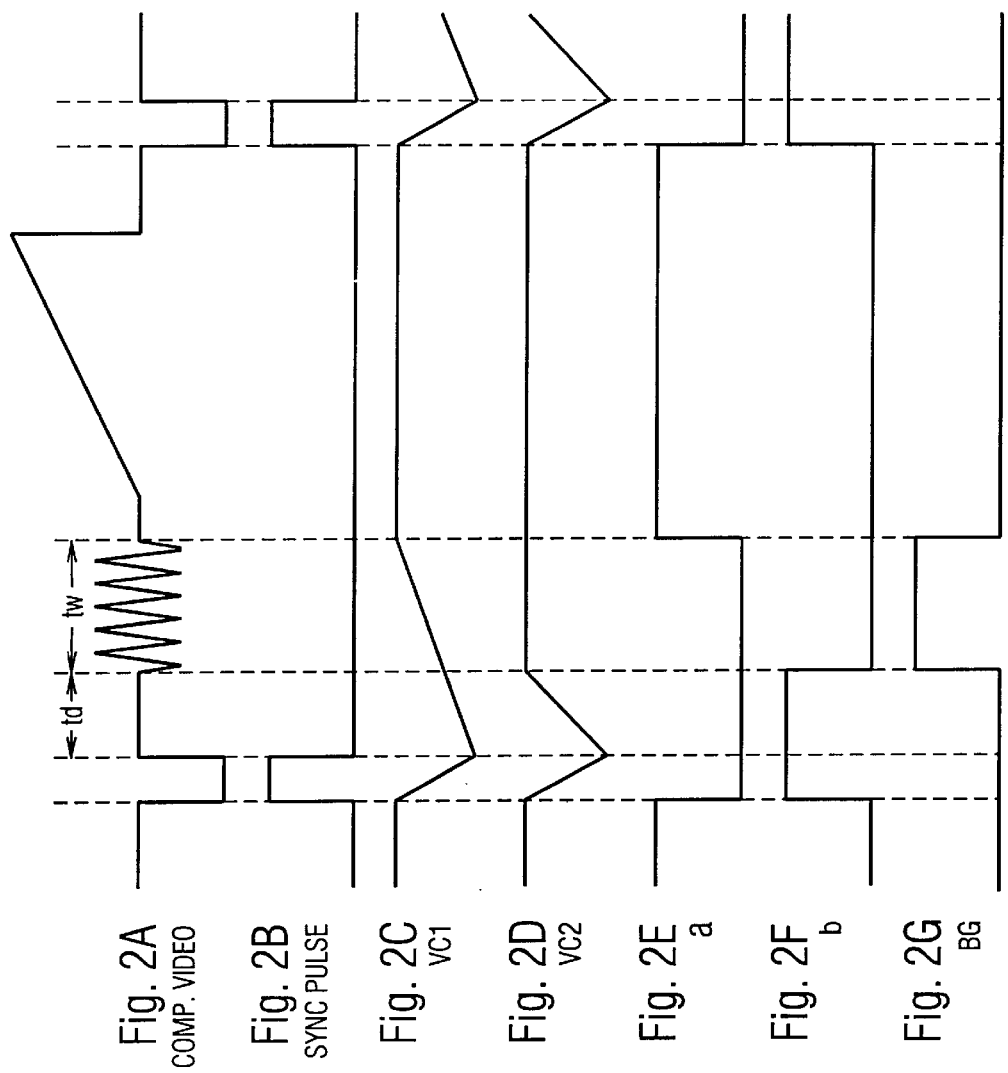

BURST GATE PULSE GENERATOR CIRCUIT

FIELD OF THE INVENTION

The present invention relates to the field of separating a burst signal from a composite video signal. In particular, the present invention relates to the field of generating a pulse which indicates the presence of a burst signal within a composite video signal for separating the burst signal from the composite video signal.

BACKGROUND OF THE INVENTION

A composite color video signal includes horizontal synchronizing signals, a burst signal superimposed onto the pedestal level at the back porch of the horizontal synchronizing signal and a video information signal. The video information signal comprises a chrominance subcarrier having different phases with the amplitude-modulated chrominance information. The composite color video signal includes both luminance and chrominance information.

To encode RGB signals into a composite video signal which is compatible with the acceptable standards, the subcarrier signal should be included. This subcarrier signal is used as a reference during the chroma decoding process. This subcarrier reference signal must be inserted at the proper place in the composite video signal. The subcarrier reference signal must also have the proper duration. The position and the width of the subcarrier reference signal pulse is critical in order for the receivers to correctly decode the chroma signals.

Burst gate pulse generator circuits of the prior art have used external components to generate the precision timing signals necessary to generate a burst gate pulse. External components are required because the absolute accuracy of devices within an integrated circuit environment is quite poor. However, the relative accuracy of devices within such a circuit is very good. In fact, the relative value of a pair of matched identical resistors will typically deviate by less than one percent. External components are used in such burst gate pulse generator circuits because they may be selected for high absolute accuracy, thereby providing means to generate the high absolute accuracy timing signals necessary to generate an accurate burst gate pulse. External components are undesirable because they add costs to a system, take up extra space around a circuit within the system and require a dedicated pin on the integrated circuit to which they are coupled, therefore mandating that the integrated circuit is bigger than it otherwise would have to be. What is needed is a burst gate pulse generator circuit which does not require external components to generate the timing signals and a burst gate pulse.

SUMMARY OF THE INVENTION

A burst gate pulse generator circuit generates a burst gate pulse signal representative of a time period during which a burst signal is present within a composite video signal without requiring external components. Each period of the composite video signal includes a horizontal synchronization signal pulse, a burst signal and a video information signal. A pair of integrated capacitors are discharged during the horizontal synchronization pulse. The capacitors are charged at different rates by two current sources after the horizontal synchronization pulse. A first amount of charge across a first capacitor rises above a predetermined threshold level in a first time period. The burst gate pulse signal is activated when the first amount of charge rises above the predetermined threshold level. This occurs before the burst signal is present within the composite video signal. A second amount of charge across a second capacitor rises above the predetermined threshold level in a second time period. The burst gate pulse signal is deactivated when the second amount of charge rises above the predetermined threshold level. This occurs after the burst signal is complete within the composite video signal.

BRIEF DESCRIPTION OF THE DRAWINGS

FIG. 2A illustrates a waveform of a composite video signal.

FIG. 2B illustrates a waveform of a sync pulse input to the burst gate pulse generator circuit of FIG. 1.

FIG. 2C illustrates a waveform representing the voltage VC1, across the capacitor C1, within the circuit, illustrated in FIG. 1.

FIG. 2D illustrates a waveform representing the voltage VC2, across the capacitor C2, within the circuit, illustrated in FIG. 1.

FIG. 2E illustrates a waveform representing the signal at the node a within the circuit, as illustrated in FIG. 1.

FIG. 2F illustrates a waveform representing the signal at the node b within the circuit, as illustrated in FIG. 1.

FIG. 2G illustrates a burst gate pulse waveform BG, representing the pulse generated by the burst gate pulse generator circuit of FIG. 1.

DETAILED DESCRIPTION OF THE PREFERRED EMBODIMENT:

Within a composite video signal, a burst signal traditionally follows a horizontal synchronization signal and precedes the video information signal. The burst gate pulse generator detects the end of the horizontal synchronization signal and begins the burst gate pulse signal a predetermined period of time after the end of the horizontal synchronization signal. Once the burst gate pulse signal is active, a timing circuit is used for the determination of the length of the burst gate pulse signal. The burst signal begins about 500 nanoseconds after the horizontal synchronization signal. The burst signal has a duration of about 2.8 microseconds.

The burst gate pulse generator circuit of the present invention generates the burst gate pulse signal without requiring dedicated external components. Instead, the burst gate pulse generator circuit uses a horizontal sync pulse signal as a reference from which the timing for the burst gate pulse signal is derived. The horizontal sync pulse signal is precise in nature in order to meet specific standards, such as the NTSC video standards. When the horizontal sync pulse signal is active, a pair of capacitors are discharged from a threshold level. When the horizontal sync pulse is complete, the pair of capacitors are charged back up to the threshold level at different rates. The current sources used to charge up the pair of capacitors provide different current values, such that the capacitors will reach the threshold level at different points in time. When the voltage across the first capacitor reaches the threshold level, the burst gate pulse signal is activated. When the voltage across the second capacitor reaches the threshold level, the burst gate pulse signal is deactivated. In this manner, using a pair of matched capacitors, the burst gate pulse generator circuit of the present invention generates the burst gate pulse signal accurately without the use of external components.

Figure 1:
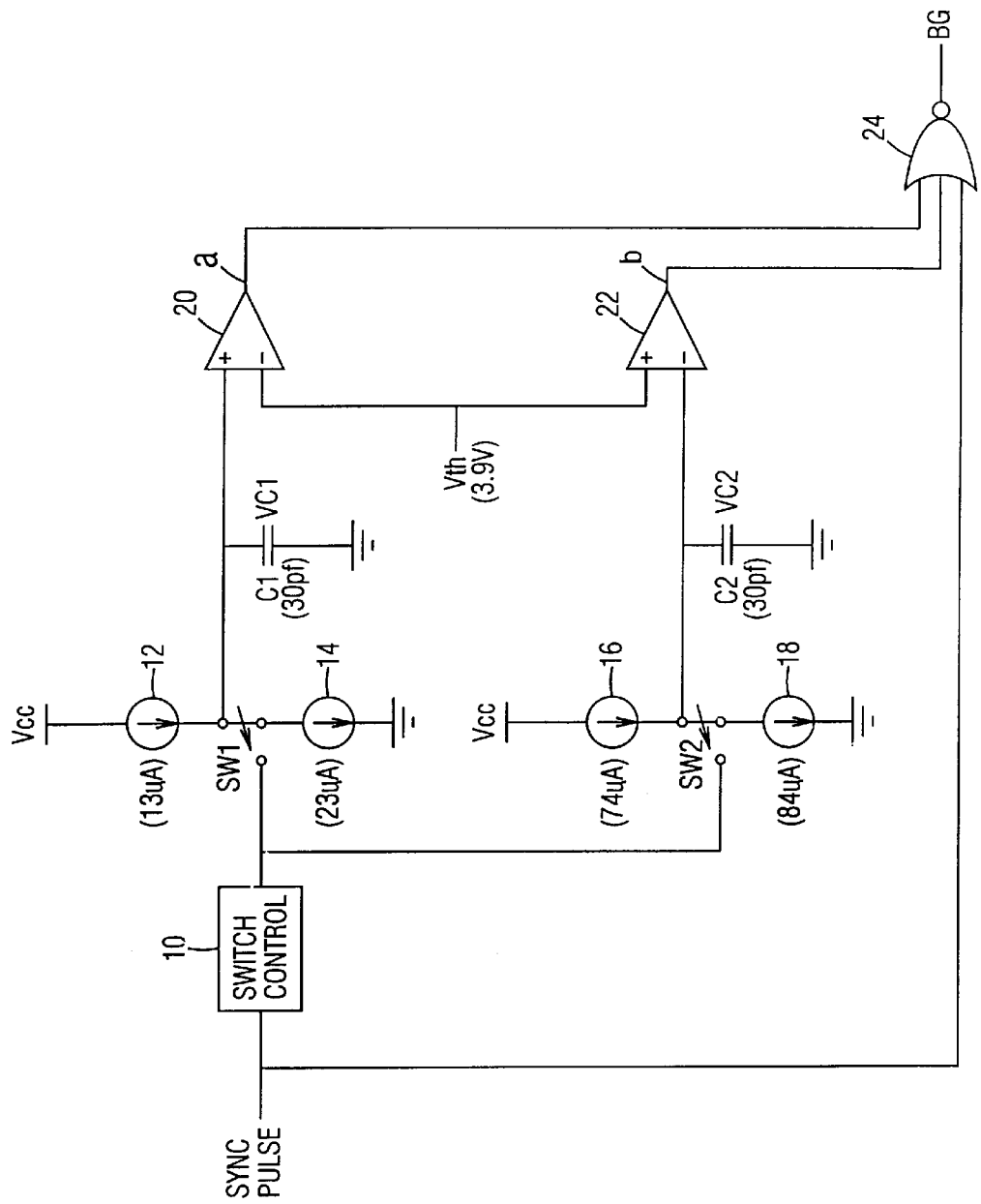
FIG. 1 illustrates a schematic diagram of a burst gate pulse generator circuit according to the present invention.

A burst gate pulse generator circuit according to the present invention is illustrated in FIG. 1. A sync pulse input representing the horizontal sync pulse of a composite video signal is coupled as an input to a switch control circuit 10 and as an input to a logical NOR gate 24. An output of the switch control circuit 10 is coupled to a first terminal of switches SW1 and SW2 to control the operation of the switches SW1 and SW2. A first terminal of a current source 12 is coupled to a supply voltage VCC. A second terminal of the current source 12 is coupled to a second terminal of the switch SW1, to a first terminal of a capacitor C1 and to a positive input of a comparator 20. A second terminal of the capacitor C1 is coupled to ground. A third terminal of the switch SW1 is coupled to a first terminal of a current source 14. A second terminal of the current source 14 is coupled to ground.

A first terminal of a current source 16 is coupled to the supply voltage VCC. A second terminal of the current source 16 is coupled to a second terminal of the switch SW2, to a first terminal of a capacitor C2 and to a negative input of a comparator 22. A second terminal of the capacitor C2 is coupled to ground. A third terminal of the switch SW2 is coupled to a first terminal of a current source 18. A second terminal of the current source 18 is coupled to ground. A negative input of the comparator 20 and a positive input of the comparator 22 are both coupled to a constant voltage threshold signal Vth, which preferably has a constant value of 3.9 volts. An output of the comparator 20 is coupled to an input of the logical NOR gate 24, thereby forming a node a. An output of the comparator 22 is coupled to an input of the logical NOR gate 24, thereby forming a node b. An output of the logical NOR gate 24 provides the burst gate pulse signal BG as the output of the burst gate pulse generator circuit illustrated in FIG. 1.

In operation, the circuit illustrated in FIG. 1 generates the burst gate pulse signal BG representing the time period when the burst signal is present within a composite video signal. Timing diagrams showing a composite video signal and relevant points within the burst gate pulse generator circuit of FIG. 1 are illustrated in FIG. 2. A waveform representing the input composite video signal is illustrated in FIG. 2A. A waveform representing a sync pulse generated from the composite video signal is illustrated in FIG. 2B. The sync pulse input signal of FIG. 2B is generated by a horizontal sync pulse generator circuit from the composite video signal, as is well known within the art, and represents the time period when the horizontal sync pulse is present within the composite video signal. A waveform representing a voltage VC1 across the capacitor C1 is illustrated in FIG. 2C. A waveform representing a voltage VC2 across the capacitor C2 is illustrated in FIG. 2D. A waveform representing the signal at the node a is illustrated in FIG. 2E. A waveform representing the signal at the node b is illustrated in FIG. 2F. A burst gate pulse signal BG waveform representing the pulse generated by the burst gate pulse generating circuit of FIG. 1, is illustrated in FIG. 2G.

The sync pulse signal, illustrated in FIG. 2B, is at a logical high voltage level when the horizontal sync pulse is present on the composite video signal. During the remainder of the composite video signal, the sync pulse signal is at a logical low voltage level. When the horizontal sync pulse is at a logical high voltage level, the switch control circuit 10 closes the switches SW1 and SW2, allowing both of the capacitors C1 and C2 to discharge. When the switch SW1 is closed, the current source 14 sinks a current which is 10 microamps above the current provided by the current source 12. When the switch SW2 is closed, the current source 18 sinks a current which is 10 microamps above the current provided by the current source 16. Accordingly, the capacitors C1 and C2 will discharge at the same rate when the switches SW1 and SW2 are closed. Therefore, the absolute values of the capacitors C1 and C2 are not critical to the precise timing of the burst gate pulse signal. The absolute size of the capacitors C1 and C2 is also not critical because only the amount of charge depleted and replaced during a cycle is used in determining the timing for generating the burst gate pulse signal. The voltage value reached by the capacitors C1 and C2 during the discharge cycle is not critical for timing purposes.

When the sync pulse signal falls to a logical low voltage level, signalling the completion of the horizontal sync pulse within the composite video signal, the switch control circuit 10 opens the switches SW1 and SW2, beginning the charging cycle of the capacitors C1 and C2, respectively. As illustrated in FIGS. 2C and 2D, during the charging period of the capacitors C1 and C2, the voltages VC1 and VC2, across the capacitors C1 and C2, respectively, have a slope equal to the current from the respective current source 12 and 16, divided by the value of the capacitor C1 and C2. The current source 12 preferably provides a current equal to 13 microamps and the current source 16 preferably provides a current equal to 74 microamps. Accordingly, the voltages VC1 and VC2, across the capacitors C1 and C2 will charge up to the threshold level Vth at different rates, as illustrated in FIGS. 2C and 2D.

The current provided by the current source 16 is much greater than the current provided by the current source 12. Accordingly, the voltage VC2, across the capacitor C2, will reach the threshold level Vth faster than the voltage VC1, across the capacitor C1. The burst gate pulse signal BG is activated when the voltage VC2 reaches the threshold level Vth after a horizontal sync pulse, signalling the beginning of the burst signal within the composite video signal. The burst gate pulse signal BG is deactivated when the voltage VC1 reaches the threshold level Vth, after a horizontal sync pulse, signalling the completion of the burst signal within the composite video signal.

At the beginning of the horizontal sync pulse within the composite video signal, the sync pulse rises to a logical high voltage level and the switch control circuit 10 closes the switches SW1 and SW2. When the switches SW1 and SW2 are closed, the voltages VC1 and VC2, across the capacitors C1 and C2, respectively, are discharged. Because the voltage VC1, across the capacitor C1, is less than the threshold voltage Vth, the signal provided by the comparator 20, at the node a, falls to a logical low voltage level. Correspondingly, because the voltage VC2, across the capacitor C2, is less than the threshold voltage Vth, the signal provided by the comparator 22, at the node b, rises to a logical high voltage level.

The sync pulse is preferably used as an input to the logical NOR gate 24, because without the sync pulse as an input, there is a possibility for a glitch in the burst gate pulse signal BG at the beginning of the horizontal sync pulse. When the horizontal sync pulse is activated, it is possible that the signals at the nodes a and b could both be at a logical low voltage level at the same time, which would cause the output of the logical NOR gate 24, to rise to a logical high voltage level until the signal at the node b fell to a logical low voltage level. However, because the sync pulse is provided as an input to the logical NOR gate 24, the output of the logical NOR gate 24 will not rise to a logical high voltage level during the horizontal sync pulse.

At the completion of the horizontal sync pulse within the composite video signal, the sync pulse falls to a logical low voltage level and the switch control circuit 10 opens the switches SW1 and SW2. When the switches SW1 and SW2 are open, the voltages VC1 and VC2, across the capacitors C1 and C2, respectively, are charged up by the current sources 12 and 16. As stated above, the voltage VC2, across the capacitor C2, will charge up faster than the voltage VC1, across the capacitor C1. When the voltage VC2, across the capacitor C2, reaches the threshold level Vth, the output of the comparator 22 at the node b, falls to a logical low voltage level. When the signal at the node b falls to a logical low voltage level, all of the inputs to the logical NOR gate 24 are at logical low voltage levels and the output BG of the logical NOR gate 24 becomes active and will therefore preferably rise to a logical high voltage level. This signals that the burst signal is present within the composite video signal.

When the voltage VC1, across the capacitor C1, reaches the threshold level Vth, the output of the comparator 20 at the node a, rises to a logical high voltage level. When the signal at the node a rises to a logical high voltage level, the output BG of the logical NOR gate 24 becomes inactive and will preferably fall to a logical low voltage level, signalling that the burst signal is no longer present on the composite video signal. In this manner, the burst gate pulse signal BG is active when the burst signal is present within the composite video signal by using a matched pair of internal capacitors, without requiring any external components.

The capacitors C1 and C2, preferably both have a value equal to 30 picofarads. However, as stated above, this value of the capacitors C1 and C2 is not critical, as long as the capacitors C1 and C2 have the same value. The current source 12 preferably provides a current equal to 13 microamps. The current source 14 preferably sinks a current equal to 23 microamps. The current source 16 preferably provides a current equal to 74 microamps. The current source 18 preferably sinks a current equal to 84 microamps. Preferably, the threshold voltage level Vth is equal to 3.9 volts. The preferred values of the capacitors C1 and C2, the current sources 12, 14, 16 and 18 and the threshold voltage Vth have been chosen so that the voltage VC2, across the capacitor C2, will reach the threshold voltage level Vth before the burst signal is present within the composite video signal and the voltage VC1, across the capacitor C1, will reach the threshold voltage level Vth after the burst signal is complete within the composite video signal, but before the video information signal is present.

Figure 3A:
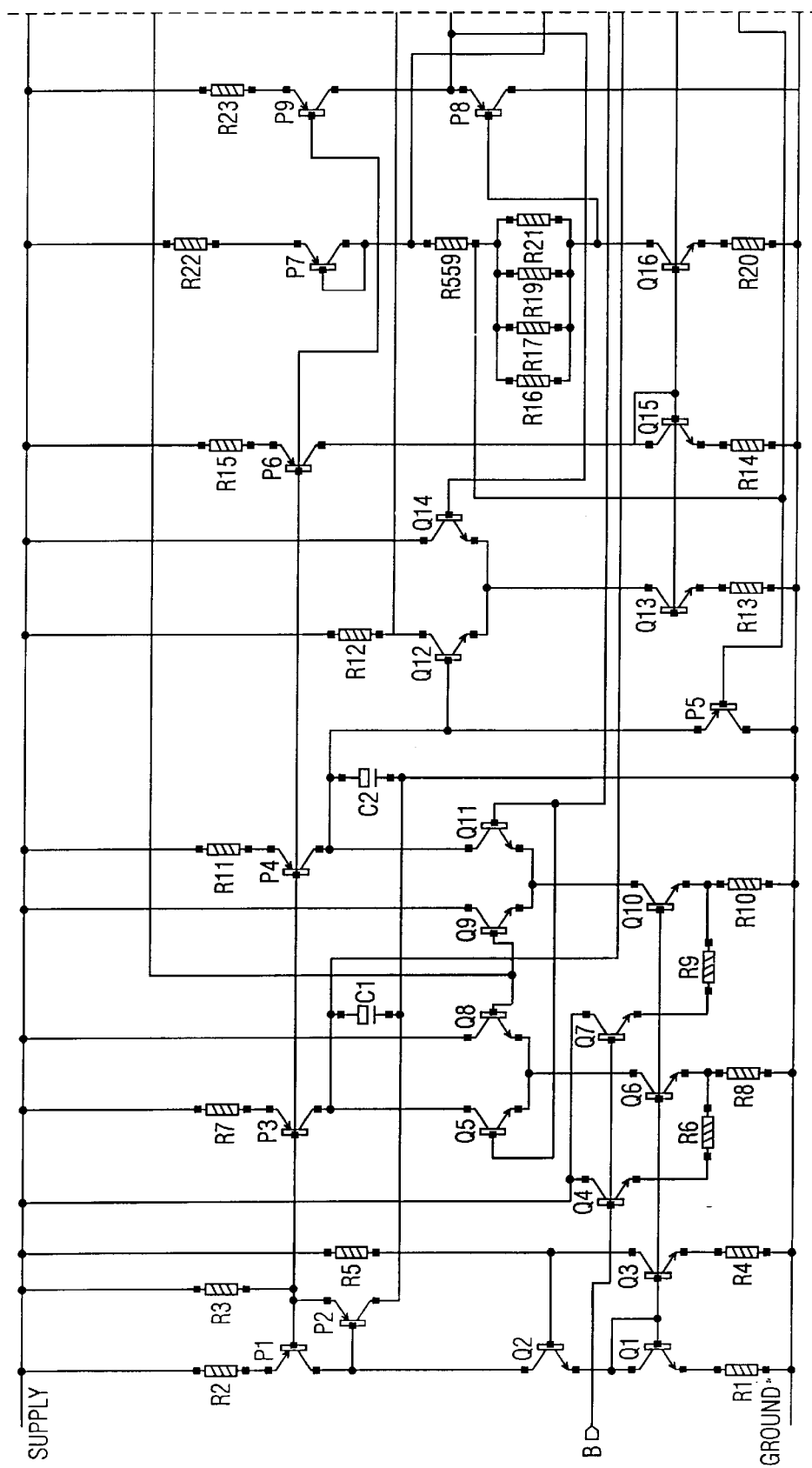
FIGS. 3A and 3B together illustrate a detailed schematic diagram of the burst gate pulse generator circuit according to the present invention.
Figure 3B:
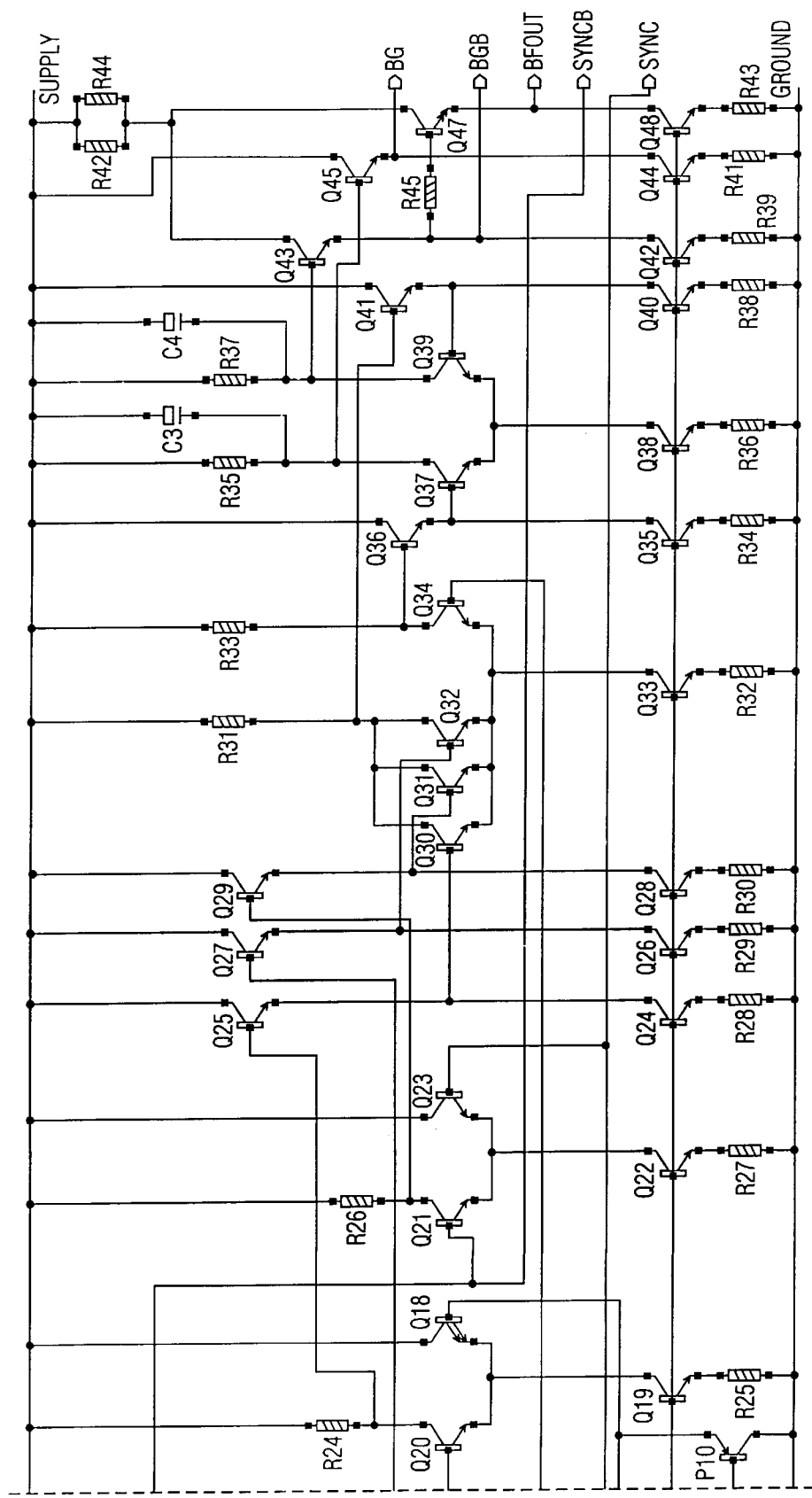

A detailed circuit schematic of the preferred embodiment of the burst gate pulse generator circuit of the present invention is illustrated in FIGS. 3A and 3B. Together, the FIGS. 3A and 3B, form a single circuit schematic, with the right edge of FIG. 3A corresponding to the left edge of the FIG. 3B. The preferred embodiment of the present invention is implemented within an analog video encoder integrated circuit, Part No. CXA2075, which will be available from Sony Corporation of America, 3300 Zanker Road, San Jose, Calif. 95134.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chose for illustration without departing from the spirit and scope of the invention. Specifically, it will be apparent to those skilled in the art that the duration of the burst gate pulse signal may be adjusted, as appropriate for the video system, by changing the values of the current sources, the capacitors and the threshold voltage level. It will also be apparent to those skilled in the art that different logic circuit configurations could be substituted for the logic circuit described above to perform the functions of the preferred embodiment. Furthermore, while preferred component values have been described, it will also be apparent that other component values could be substituted for use within the burst gate pulse generator circuit of the present invention.

We claim:

1. A burst gate pulse signal generation circuit for generating a burst gate pulse signal representing a time period during which a burst signal is present within a composite video signal, wherein each period of the composite video signal includes a horizontal sync pulse, the burst signal and a video information signal, comprising:

a. a control circuit configured for receiving a sync pulse signal which is active when the horizontal sync pulse is present within the composite video signal;

b. a first timing circuit coupled to the control circuit for activating the burst gate pulse signal a first predetermined period of time after the horizontal sync pulse is deactivated, wherein the burst gate pulse signal is activated before the burst signal is present within the composite video signal; and c. a second timing circuit coupled to the control circuit for deactivating the burst gate pulse signal a second predetermined period of time after the horizontal sync pulse is deactivated, wherein the burst gate pulse signal is deactivated after the burst signal is present and before the video information signal is present within the composite video signal.

2. The burst gate pulse signal generation circuit as claimed in claim 1 wherein the first timing circuit comprises:

a. a first charge storage device for storing a first amount of charge; and b. a first charge delivery device coupled to the first charge storage device for delivering a first precise amount of charge to the first charge storage device, wherein the burst gate pulse signal is activated when the first amount of charge exceeds a predetermined threshold level.

3. The burst gate pulse signal generation circuit as claimed in claim 2 wherein the second timing circuit comprises:

a. a second charge storage device for storing a second amount of charge; and b. a second charge delivery device coupled to the second charge storage device for delivering a second precise amount of charge to the second charge storage device, wherein the burst gate pulse signal is deactivated when the second amount of charge exceeds a predetermined threshold level.

4. The burst gate pulse signal generation circuit as claimed in claim 3 wherein the control circuit controls the first and second charge delivery devices and further wherein the first and second charge delivery devices deliver charge to the first and second charge storage devices after a horizontal sync pulse.

5. The burst gate pulse signal generation circuit as claimed in claim 4 wherein the first and second charge storage device are capacitors and the first and second charge delivery devices are current sources.

6. The burst gate pulse signal generation circuit as claimed in claim 5 wherein the first and second charge storage devices are implemented within an integrated circuit and further wherein the burst gate pulse signal generation circuit does not require any external components for its operation.

7. The burst gate pulse signal generation circuit as claimed in claim 6 wherein the first and second charge storage devices have the same capacitive value.

8. A method of generating a burst gate signal representing a time period during which a burst signal is present within a composite video signal, wherein each period of the composite video signal includes a horizontal sync pulse, a burst signal and a video information signal, the method comprising the steps of:
   a. detecting a completion of a sync pulse signal;
   b. activating first and second timing circuits after the completion of the sync pulse signal, wherein the first timing circuit includes a first charge storage device which is charged at a first rate and the second timing circuit includes a second charge storage device which is charged at a second rate;
   c. activating a burst gate signal when a first level of charge across the first charge storage device exceeds a predetermined threshold; and
   d. deactivating the burst gate signal when a second level of charge across the second charge storage device exceeds the predetermined threshold.

9. The method as claimed in claim 8 further comprising the step of discharging the first and second charge storage devices during the sync pulse signal.

10. The method as claimed in claim 9 wherein the first and second charge storage devices are discharged at the same rate.

11. The method as claimed in claim 10 wherein the first and second charge storage devices are capacitors.

12. The method as claimed in claim 11 wherein the first and second charge storage devices are charged by current sources.

13. The method as claimed in claim 12 wherein the first and second charge storage devices are implemented within an integrated circuit without requiring any external components for generating the burst gate signal.

14. The method as claimed in claim 13 wherein the first and second charge storage devices have the same capacitive value.

15. An integrated circuit including a burst gate pulse generation circuit for generating a burst gate signal without requiring any external components for operation of the burst gate pulse generation circuit, wherein the burst gate signal represents a time period during which a burst signal is present within a composite video signal, and further wherein each period of the composite video signal includes a horizontal sync pulse, the burst signal and a video information signal, comprising:
   a. a first charge storage device for storing a first amount of charge;
   b. a second charge storage device for storing a second amount of charge;
   c. a first charge delivery device coupled to the first charge storage device for delivering a first precise amount of charge to the first charge storage device;
   d. a second charge delivery device coupled to the second charge storage device for delivering a second precise amount of charge to the second charge storage device;
   e. a first discharging device coupled to the first charge storage device for discharging the first amount of charge;
   f. a second discharging device coupled to the second charge storage device for discharging the second amount of charge;
   g. a control circuit coupled to the first and second charge delivery devices, to the first and second discharging devices and configured for receiving a sync pulse signal which is active when the horizontal sync pulse is present within the composite video signal, wherein the control circuit activates the first and second discharging devices when the sync pulse signal is active and activates the first and second charge delivery devices when the sync pulse signal transitions from active to inactive;
   h. a first comparing circuit coupled to the first charge storage device for comparing the first amount of charge to a predetermined threshold, wherein a burst gate signal is activated when the first amount of charge exceeds the predetermined threshold; and
   i. a second comparing circuit coupled to the second charge storage device for comparing the second amount of charge to the predetermined threshold, wherein the burst gate signal is deactivated when the second amount of charge exceeds the predetermined threshold.

16. The integrated circuit as claimed in claim 15 wherein the circuit further comprises a switching circuit for controlling the first and second charge delivery devices and the first and second discharging devices.

17. The integrated circuit as claimed in claim 16 wherein the first and second charge storage devices are capacitors and the first and second charge delivery devices are current sources.

18. The integrated circuit as claimed in claim 17 wherein the first and second charge storage devices have the same capacitive value.

* * * * *